United States Patent
Ouellette et al.

(10) Patent No.: US 7,191,355 B1
(45) Date of Patent: Mar. 13, 2007

(54) CLOCK SYNCHRONIZATION BACKUP MECHANISM FOR CIRCUIT EMULATION SERVICE

(75) Inventors: Michel Ouellette, Plantagenet (CA); Jeganathan Markandu, Kanata (CA); James Aweya, Kanata (CA); Delfin Montuno, Kanata (CA)

(73) Assignee: Nortel Networks Limited (CA)

( * ) Notice: Subject to any disclaimer, the term of this patent is extended or adjusted under 35 U.S.C. 154(b) by 458 days.

(21) Appl. No.: 10/888,421

(22) Filed: Jul. 9, 2004

Related U.S. Application Data

(63) Continuation-in-part of application No. 10/076,415, filed on Feb. 19, 2002, now Pat. No. 7,043,651.

(51) Int. Cl.
*G06F 1/12* (2006.01)
*H04L 12/28* (2006.01)

(52) U.S. Cl. .................. 713/400; 370/396
(58) Field of Classification Search ............ 370/395; 713/375–400
See application file for complete search history.

(56) References Cited

U.S. PATENT DOCUMENTS 6,990,109 B2 * 1/2006 Mitchell et al. ....... 370/395.62

* cited by examiner

*Primary Examiner*—A. Elamin
*Assistant Examiner*—Mohammed H. Rehman
(74) *Attorney, Agent, or Firm*—McGuinness & Manaras LLP

(57) ABSTRACT

A clock synchronization backup mechanism is disclosed for maintaining clock synchronization during periods of degraded synchronization. The clock synchronization backup mechanism includes a jitter buffer having a fill value at a given sample time which is compared with a threshold. When the jitter buffer fill value exceeds the threshold, a non-normal condition is registered and the local clock frequency is set to a combination of a long-term frequency setting plus a threshold sensitive frequency adjustment. The clock synchronization backup mechanism is particularly useful for overcoming residual errors accumulated due to temperature change, oscillator degradation, and a variety of other system perturbations problematical for clock synchronization mechanisms known in the art.

15 Claims, 8 Drawing Sheets

```
/* initialize parameters */
/* current_dac : the current DAC value */
/* weighted_dac : the averaged DAC value */
/* weighted_jitter_buf_len : the averaged jitter buffer length */
/* dac_alpha : weight for DAC averaging */
/* buffer_alpha : weight for buffer length averaging */
/* current_jitter_buf_len : current jitter buffer length */
weighted_dac = current_dac;
weighted_jitter_buf_len = JB_THRESHOLD;
system_status = NORMAL;
dac_alpha    = 0.9;
buffer_alpha = 0.9;

/* set current DAC value according to NORMAL, OVERFLOW, or UNDERFLOW mode */
while (1) { weighted_jitter_buf_len = weighted_jitter_buf_len * buffer_alpha +
                              current_jitter_buf_len * (1-buffer_alpha);

if the system_status == NORMAL {
        current_dac = filter output; /* get output of the loop filter */
        weighted_dac = weighted_dac * dac_alpha + current_dac * (1-dac_alpha);
        if weighted_jitter_buf_len >= HIGH_UNSAFE_BOUND {
            current_dac = weighted_dac + DAC_ADJUSTMENT
            system_status = OVERFLOW;
        } else if weighted_jitter_buf_len <= LOW_UNSAFE_BOUND {
            current_dac = weighted_dac - DAC_ADJUSTMENT
            system_status = UNDERFLOW;
        }
    }
    else if system_status == OVERFLOW &&
            weighted_jitter_buf_len < JB_THRESHOLD then
                system_status = NORMAL;
    else if system_status == UNDERFLOW &&
            weighted_jitter_buf_len > JB_THRESHOLD then
                system_status = NORMAL;

CLOCK SYNCHRONIZATION BACKUP MECHANISM FOR CIRCUIT EMULATION SERVICE

RELATED U.S. APPLICATION DATA

This patent application is a continuation-in-part application of U.S. patent application Ser. No. 10/076,415, filed Feb. 19, 2002, now U.S. Pat. No. 7,043,651 the contents of which are hereby incorporated by reference.

FIELD OF THE INVENTION

The present invention relates to clock synchronization mechanisms and is particularly concerned with compensation for long-term frequency drifts.

BACKGROUND OF THE INVENTION

Clock synchronization in a communication network is the means by which a clock signal is generated or derived and distributed through the network and its individual nodes for the purpose of ensuring synchronized network operation. Herein, clocking refers to a process whereby a timing signal is used by a physical interface of a network device to put data on a transmission media as well as extract data from the transmission media. In other words, clocking at a physical interface of a network device controls the speed at which data is transmitted on a physical connection.

Two main performance degradation issues come into play when clocks at a transmitter and a receiver are not synchronized. First, if the physical interfaces along a connection are not synchronized (i.e., not driven by a clocking signal of identical frequency), data can be lost due to buffer overflow or underflow, resulting in periodic line errors. When the physical interfaces are synchronized, then, within a given time window, the same amount of data is transmitted or forwarded at every point in the connection. Second, imperfections in clock synchronization can lead to observable defects on an end service such as bit errors due to alignment jitter when interworking with a plesiochronous digital hierarchy (PDH) or a synchronous digital hierarchy (SDH) network, or frame slips when interworking with a public switched telephone network (PSTN) or an integrated service digital network (ISDN).

The widespread acceptance of packet-switched technologies such as IP/Ethernet and recent advances in high-speed switching and forwarding, and quality of service (QoS) management has made it possible to build converged voice and data networks. By using IP/Ethernet, various services such as voice, video, and data can be multiplexed, switched, and transported together under a universal format. Full integration will likely result in simpler and more efficient network and service administration and management.

However, the demand for high quality real-time multimedia applications requiring strict clock synchronization properties, such as digital television and voice processing, is on the increase. Clock synchronization is an important design consideration in time division multiplexing (TDM) networks, and in packet networks carrying TDM voice or video traffic. TDM data, for instance, must be received and transmitted at the same rate at every hop in a connection. Packet networks that carry pure data traffic that do not require an end-to-end timing relationship (e.g., TCP/IP traffic) need not worry as much about clock quality. IP/Ethernet networks offer essentially an asynchronous transmission service, thus making the synchronization needs of real-time applications difficult to meet in these networks. Unlike packet switched networks, circuit switched networks (which typically use TDM) are engineered to minimize switching and transmission jitter that degrade the quality of voice and data services. Switching and transmission jitter is minimized by synchronizing input and output links at every node via, for example, pulse stuffing techniques.

To interwork with a circuit switched network whose services are pre-dominantly time-sensitive, a packet (e.g., IP) network must essentially behave as a transparent "link" in an end-to-end connection. This transparent inclusion of a packet network in an end-to-end path of a connection that carries circuit-switched time sensitive services is referred to as "circuit emulation" on the packet network. Circuit emulation services (CES) allow a network operator to seamlessly migrate network core infrastructure from circuit switched to packet switched, while preserving the legacy circuit switched end equipment.

A good clock synchronization scheme is essential for the successful deployment of CES. Packet networks that transport voice, video, and/or telephony services also require an end-to-end timing relationship and therefore must have well-designed network clock synchronization mechanisms. Lack of synchronization traceability between TDM equipment interconnected over a packet network may result in frame or byte slips which can affect data integrity. Thus, critical to performance, transmission, data integrity, and ultimately quality of service of any network where TDM and real-time services are supported, is the manner by which the various network equipment derive and maintain synchronization.

There are three broad categories of clock synchronization in a packet network. First, in a network synchronous approach, all devices are clocked from a common clock or primary reference source (PRS). This offers the best clock quality, but can be expensive since the network requires a PRS and a clock distribution service, except in toll-bypass networks where there is a PRS at each end of the packet network. The regulatory constraints may also make this approach impractical.

Second, a transmitter and a receiver may be clocked independently. That is, usually the clocks at the transmitter and receiver will have the same nominal frequency but differ in their amounts of random variation from the nominal values (e.g., in parts per million, ppm). In this case, the transmitter sends data out with a locally generated, independent clock and any difference that might occur between the receiver and transmitter clocks is taken up with a "slip buffer" which can insert or delete bits from the data stream if the need arises. This technique cannot guarantee the bit level integrity of the data unless the transmitter and receiver clocks are synchronized with each other.

Third, a receiver may derive an estimate of the transmitter clock from the received data stream. This is commonly done using a phase-locked loop (PLL) that slaves the receiver clock to a transmitter clock. The PLL is able to process transmitted clock samples encoded within the data stream, or process data arrival patterns to generate a timing signal for the receiver. The purpose of the PLL is to estimate and compensate for the frequency drift occurring between the oscillators of the transmitter clock and the receiver clock. In operation, the presence of transmission jitter affects the performance of the clock estimation/compensation process, making the transmitter clock appear faster or slower than it actually is, and ultimately, causing the propagation of some residual jitter to the receiver clock signal. The presence of even a modest amount of jitter makes the clock recovery problem difficult. The design of the PLL must ensure that clock impairments are within acceptable limits for the intended applications.

In the timestamp-based scheme, the transmitter sends an explicit time indication or timestamp (in a packet with or without user data) to the receiver so that it can synchronize its local clock to that of the transmitter. Since no common network clock is used, the receiver relies on locking the receiver clock to the arrival of the timestamp patterns. The timestamp method is analogous to the periodic insertion of synchronizing patterns into the bit stream at the transmitter. At the receiver, the synchronizing patterns are detected and used to generate a reference signal for a PLL.

In real-time data transmission, for example, to synchronize non-periodically transmitted data (e.g., possibly due to data compression or silence suppression as in voice traffic), the timestamp method uses a monotonic clock. This monotonic clock is usually incremented in time units that are smaller than the smallest block size of the data stream. The initial monotonic clock value can be random.

Referring to FIG. 1, there is shown a communication system 10 which implements a clock synchronization scheme based upon the timestamp method. The communication system 10 comprises a transmitter 12, a receiver 14, and a network 16 through which packets 17 are sent from the transmitter 12 to the receiver 14. The transmitter 12 comprises a network adaptor 18 and a transmitter clock 20. The transmitter clock 20 comprises an oscillator 22 and a first pulse counter 24. The receiver 14 comprises a jitter buffer 26 and a receiver clock 28. The receiver clock 28 comprises a phase-locked loop (PLL) 30 having a differencing element 32, a loop filter 34, and a local clock 36. The local clock 36 comprises a voltage controlled oscillator (VCO) (or digitally controlled oscillator (DCO)) 38 and a second pulse counter 40.

The clock synchronization scheme implemented in the communication system 10 allows multiple receivers (e.g., in a broadcast or point-to-multipoint communication scenario) to synchronize their clocks to that of the transmitter clock generated by the oscillator 22. The oscillator 22 issues periodic pulses that are input to the first pulse counter 24. The oscillator 22 has a frequency that is the inverse of the interval between consecutive pulses (i.e., the oscillator period). The output of the first pulse counter 24 represents the transmitter clock signal and is incremented by a fixed amount at each pulse. Samples of transmitter clock are communicated to the receiver 14 in packets 17 as timestamps.

At the receiver 14, the PLL 30 uses the timestamps (which constitute the PLL reference signal) to synchronize with the transmitter clock. At the differencing element 32, an error signal is generated from the difference between the reference signal (i.e., the timestamps) and a feedback signal from the second pulse counter 40. The error signal is passed on to the loop filter 34, which is responsible for eliminating possible jitter and noise in received input signals. The VCO (or DCO) 38, which typically has a center frequency, oscillates at a frequency which is determined by an output signal of the loop filter 34.

Ideally, there is a constant delay between the transmitter 12 and the receiver 14, and the timestamp values arriving at the receiver 14 are all consistent. However, this is not the case in packet networks. Rather, delay variation between the transmitter 12 and the receiver 14 occurs in packet networks. This delay variation complicates the clock synchronization problem because it effectively introduces network jitter to the timestamps that are generated at the transmitter 12 and received at the receiver 14.

There are three main contributors to jitter seen at the receiver 14. The first contributor is due to frequency drift between the clocks in the transmitter 12 and the receiver 14. This contribution is usually small compared to the other two contributors. The second contributor is due to packetization at the transmitter 12, which may displace timestamp values within a packet stream. Lastly, the third contributor is due to packet multiplexing and variations in queuing delays in network switches.

If a significant amount of jitter is passed on to the recovered clock, its quality may degrade (i.e., the PLL 30 may not provide a sufficiently stable clock signal). As a result, the PLL 30 must perform filtering in order to correctly estimate the transmitter clock. However, the design of the PLL 30 must be such that its filtering capabilities do not slow the responsiveness of the PLL 30 and increase the amount of time it requires to estimate the transmitter clock. This is because slow PLL responsiveness and increased transmitter clock estimation time affect the maximum phase error between the transmitter time-line and the receiver time-line which in turn increases the amount of memory in the receiver 14 that must be allocated to hold unread data. The receive (jitter) buffer 26 also has to be at least the size of the jitter amplitude (statistical bound) that the receiver 14 wants to absorb. Otherwise, packets that experience more delay than the maximum jitter amplitude are discarded.

Unfortunately, in addition to transmission jitter, poor oscillator quality, temperature change, and other unaccountable perturbations in the system affect the performance of the clock estimation/compensation process, making the transmitter clock appear faster or slower than it actually is.

In view of the foregoing, it would be desirable to provide a technique for maintaining clock synchronization during periods of degraded synchronization.

SUMMARY OF THE INVENTION

An object of the present invention is to provide an clock synchronization backup mechanism.

According to an aspect of the present invention there is provided a backup mechanism for maintaining clock synchronization during periods of degraded clock synchronization. The mechanism works by removing any residual errors accumulated due to temperature change, oscillator degradation and other unaccountable system perturbations. The mechanism is based on observing the length of a receiver jitter buffer and assessing whether the jitter buffer is in a vulnerable state, for example susceptible to overflow or underflow. This may be done, for example, by comparing it to some pre-defined thresholds. When the buffer enters the vulnerable state, e.g. the length of the buffer crosses these pre-defined thresholds, a degraded clock synchronization mode of operation is detected and the backup clock synchronization mode is activated (i.e., the clock synchronization scheme switches from primary mode to backup mode).

According to an aspect of the invention there is provided a method for maintaining clock synchronization in a network receiver having a jitter buffer and a frequency matching mechanism. The frequency matching mechanism has a primary clock recovery mechanism, a current frequency setting, a long-term frequency setting, a normal state, and an abnormal state. The method has the steps of:

(a) setting the frequency matching mechanism to the normal state;

(b) setting the current frequency setting to the frequency of the primary clock recovery mechanism;

(c) checking if the frequency matching mechanism is in the normal state;

(d) and in the case that the frequency matching mechanism is in the normal state then setting the current frequency setting to the frequency of the primary clock recovery mechanism; and (e) testing the jitter buffer so as to assess whether it is at a vulnerable state of fill;

(f) and in the case that the jitter buffer is at a vulnerable state of fill then setting the current frequency setting to the sum of the long-term frequency setting and a frequency adjustment, setting the frequency matching mechanism to the abnormal state, and returning to step (c);

(g) in the case that the jitter buffer is not at a vulnerable state of fill then returning to step (c);

(g) in the case that the frequency matching mechanism is not in the normal state then testing if it is true that the jitter buffer is at a vulnerable state of fill; and, (h) in the case that the jitter buffer is at a vulnerable state of fill then returning to step (c);

(i) in the case that the jitter buffer is not at a vulnerable state of fill then setting the frequency matching mechanism to normal state and returning to step (c).

According to another aspect of the present invention there is provided a method for maintaining clock synchronization in a network receiver having a jitter buffer and a frequency matching mechanism, the frequency matching mechanism having a primary clock recovery mechanism, a current frequency setting, a long-term frequency setting, a normal state, an underflow state, and an overflow state, and a first, second and third threshold associated with the jitter buffer.

The method has the steps of:

(a) setting said frequency matching mechanism to the normal state;

(b) setting said current frequency setting to the frequency of said primary clock recovery mechanism;

(c) receiving a jitter buffer fill value;

(d) checking if said frequency matching mechanism is in the normal state and (e) in the case that said frequency matching mechanism is in the normal state then setting said current frequency setting to the frequency of said primary clock recovery mechanism and comparing said jitter buffer fill value to a first threshold; and, (f) in the case that said jitter buffer fill value transgresses said first threshold then setting said current frequency setting to the sum of said long-term frequency setting minus a frequency adjustment, setting said frequency matching mechanism to the overflow state, and returning to step (c);

(g) in the case that said jitter buffer fill value does not transgress said first threshold then comparing said jitter buffer fill value to a second threshold; and, (h) in the case that said jitter buffer fill value transgresses said second threshold then setting said current frequency setting to the sum of said long-term frequency setting plus a frequency adjustment, setting said frequency matching mechanism to the underflow state, and returning to step (c);

(i) in the case that said jitter buffer fill value does not transgress said second threshold then returning to step (c); and (j) in the case that said frequency matching mechanism is not in the normal state then testing if it is true that said frequency matching mechanism is in the overflow state and that said jitter buffer fill value is lower than a third threshold; and, (k) in the case that the conditions, of step (j) are true then setting said frequency matching mechanism to normal state and returning to step (c); and (l) in the case that the conditions of step (j) are not true then testing if it is true that said frequency matching mechanism is in the underflow state and that said jitter buffer fill value is higher than said third threshold; and, (m) in the case that the conditions of step (l) are true then setting the frequency matching mechanism to normal state and returning to step (c); and (n) in the case that the conditions of step (l) are not true then returning to step (c).

Advantages of the present invention include maintaining clock synchronization during periods of degraded clock synchronization by removing any residual errors accumulated due to temperature change, oscillator degradation and other unaccountable system perturbations.

Under some circumstances known to those skilled in the art, it is useful to filter buffer fill values as well as output frequencies, and in these circumstances either a moving average filter or an exponentially weighted moving average filter may be used.

The present invention will now be described in more detail with reference to exemplary embodiments thereof as shown in the appended drawings. While the present invention is described below with reference to the preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

BRIEF DESCRIPTION OF THE DRAWINGS

The invention will be further understood from the following detailed description of embodiments of the invention and accompanying drawings in which:

FIG. 8 is a listing of a pseudo-code routine for the backup mechanism according to an embodiment of the invention.

DETAILED DESCRIPTION

Figure 2:
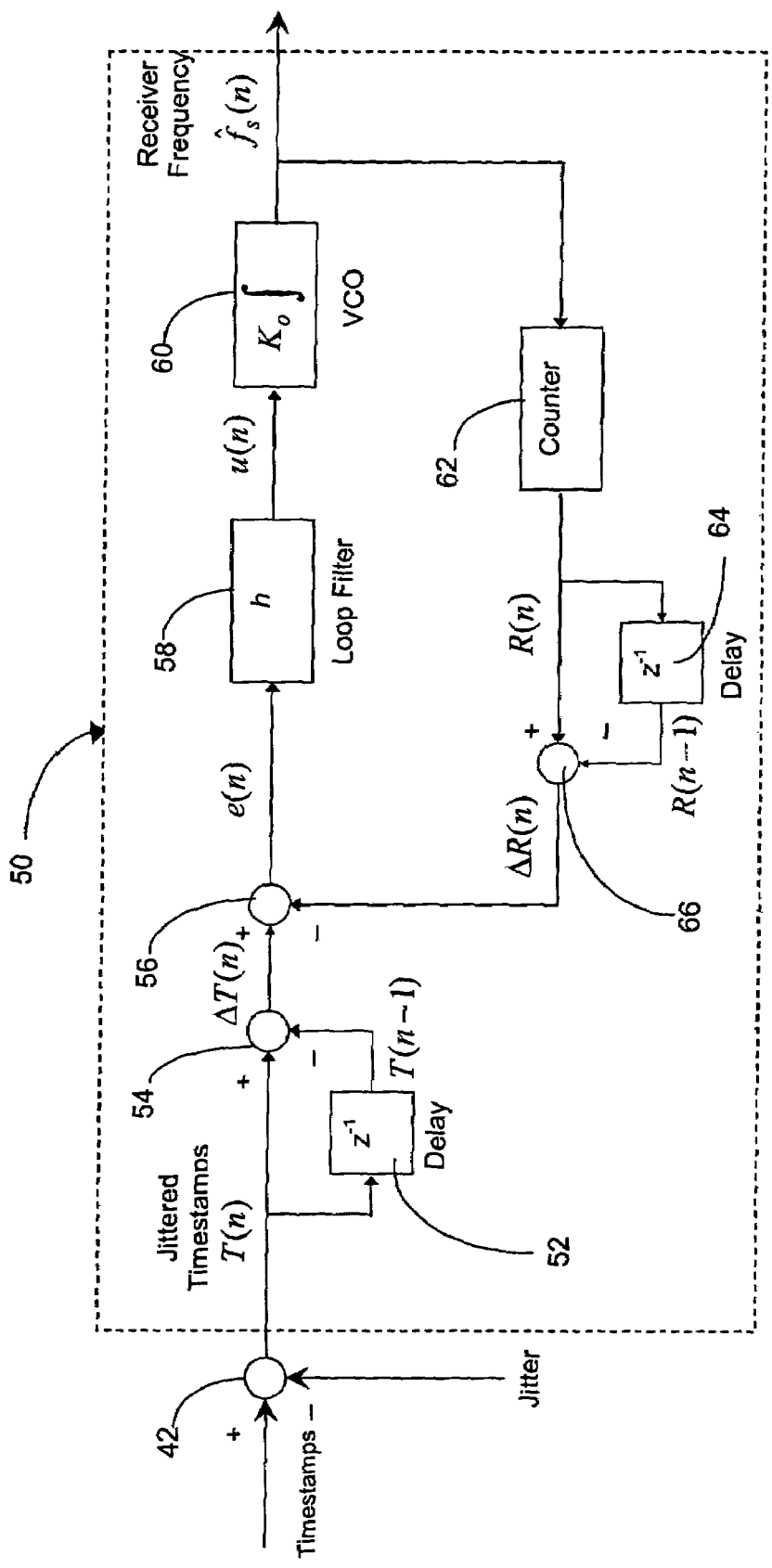
FIG. 2 is a diagram of a PLL using a difference in timestamps to synchronize a receiver frequency.

Referring to FIG. 2, there is shown an improved phase-locked loop (PLL) 50 that uses differences in timestamps to perform clock synchronization in accordance with the present invention. The improved PLL 50 comprises a first delay element 52, a first differencing element 54, a second differencing element 56, a loop filter 58, a digitally controlled oscillator (DCO) 60, a pulse counter 62, a second delay element 64, and a third differencing element 66.

FIG. 2 shows how jitter is introduced (figuratively via summing junction 42) to timestamps that are generated at a transmitter and later received at the improved PLL 50, which is located at a receiver. As indicated above, the introduced jitter is mainly caused by frequency drift between transmitter and receiver clocks, timestamp packetization, and packet multiplexing and variations in queuing delays in network switches.

It should be assumed that both the transmitter and the receiver have their own time bases which are driven by local clocks that are used in the transmission and reception of data. Let T(n) denote the time base (in clock pulses) of the transmitter, which operates at a local clock frequency of $f_s = 1/\tau_s$ Hz. Let R(n) denote the time base (in clock pulses as counted by pulse counter 62) of the receiver, which operates at a local clock frequency $\hat{f}_s = 1/\hat{\tau}_s$ Hz. These two functions correspond to the timestamps of the two clocks at discrete time instants n.

The local clock of the receiver (i.e., a local oscillator at the receiver) always has some frequency deviation (which is not constant) from its nominal frequency. Thus, the transmitter time base, T(n), and the receiver time base, R(n), are typically not the same. Also, when timestamps are transmitted from the transmitter over a packet network, they will arrive at the receiver with variable delay. Thus, if d(n) and d(n−1) denote the delay experienced by the $n^{th}$ and $(n−1)^{th}$ timestamp arriving at the receiver, respectively, then the jitter induced by the network may be defined as j(n)=Δd(n)=d(n)−d(n−1).

The timestamp difference between the $n^{th}$ and $(n−1)^{th}$ generated timestamp at the transmitter may be defined as ΔT(n)=T(n)−T(n−1). At the receiver, this timestamp difference is generated by the first delay element 52 and the first differencing element 54. Also at the receiver, the timestamp difference between the $n^{th}$ and $(n−1)^{th}$ timestamp arrivals as measured by the receiver clock may be defined as ΔR(n)=R(n)−R(n−1). This timestamp difference is generated by the second delay element 64 and the third differencing element 66. The variables ΔT(n) and ΔR(n) are all illustrated in FIG. 2.

It should be noted that the timestamp difference measured by the receiver also includes the jitter introduced between the $n^{th}$ and $(n−1)^{th}$ timestamp arrivals. Thus, the timestamp difference between the $n^{th}$ and $(n−1)^{th}$ timestamp arrivals as measured by the receiver clock may also be defined as ΔR(n)=R(n)−R(n−1).

The second differencing element 56 operates to take the difference between ΔT(n) and ΔR(n), thereby forming an error signal that may be defined by e(n)=ΔT(n)−ΔR(n). This error signal is filtered by the loop filter 58. The loop filter 58 generates an output signal represented by u(n), which is used by the VCO 60 for controlling the local clock frequency, $\hat{f}_s = 1/\hat{\tau}_s$, of the receiver. The VCO 60 has a gain represented by $K_0$.

In view of the foregoing, it is clear that the function of the improved PLL 50 is to control the local clock frequency, $\hat{f}_s$, of the receiver such that the error signal, e(n), equals zero, at which point the local clock frequency, $\hat{f}_s$ of the receiver equals the local clock frequency, $f_s$, of the transmitter. This is accomplished by making the difference between the transmitter timestamp differences ΔT(n) and the receiver timestamp differences ΔR(n) to equal zero. That is, while filtering out jitter, the local clock frequency, $\hat{f}_s$, of the receiver is controlled such that the receiver timestamp differences ΔR(n) are equal to the transmitter timestamp differences ΔT(n).

The recovered clock frequency at the receiver that drives the receiver counter 62 of FIG. 2 can also be used for data playout purposes, for example, in a packet/time-division-multiplexing (TDM) interworking unit, a video decoder, voice decoder, etc.

For example, to interwork with two end circuit switched networks whose services are pre-dominantly time-sensitive, a packet (IP) network must essentially behave as a transparent "link" in the end-to-end connection. This transparent inclusion of a packet network in an end-to-end path of a connection that carries circuit-switched time sensitive services is referred to as "circuit emulation" on the packet network. Circuit emulation services (CES) allows a network operator to seamlessly migrate network core infrastructure from circuit switched to packet switched, while preserving the legacy circuit switched end equipment. A good clock synchronization scheme is essential for the successful deployment of CES. Packet networks that transport voice/video/telephony services also require an end-to-end timing relationship and therefore must have well-designed network clock synchronization mechanisms. Lack of synchronization traceability between TDM equipment interconnected over the packet network may result in frame or byte slips which can affect data integrity.

Figure 1:
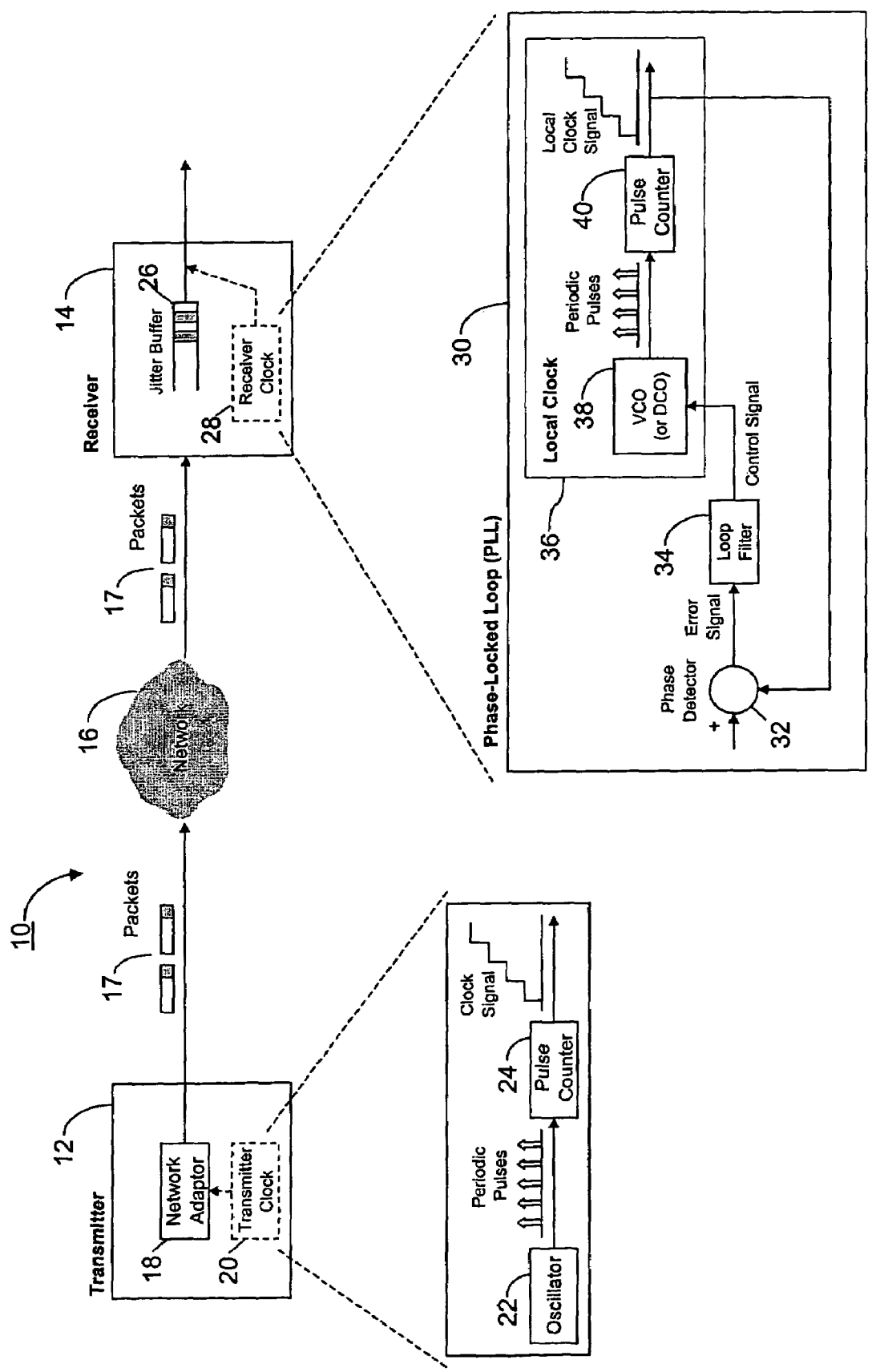
FIG. 1 is a diagram of clock synchronization scheme based upon timestamps.
Figure 3:
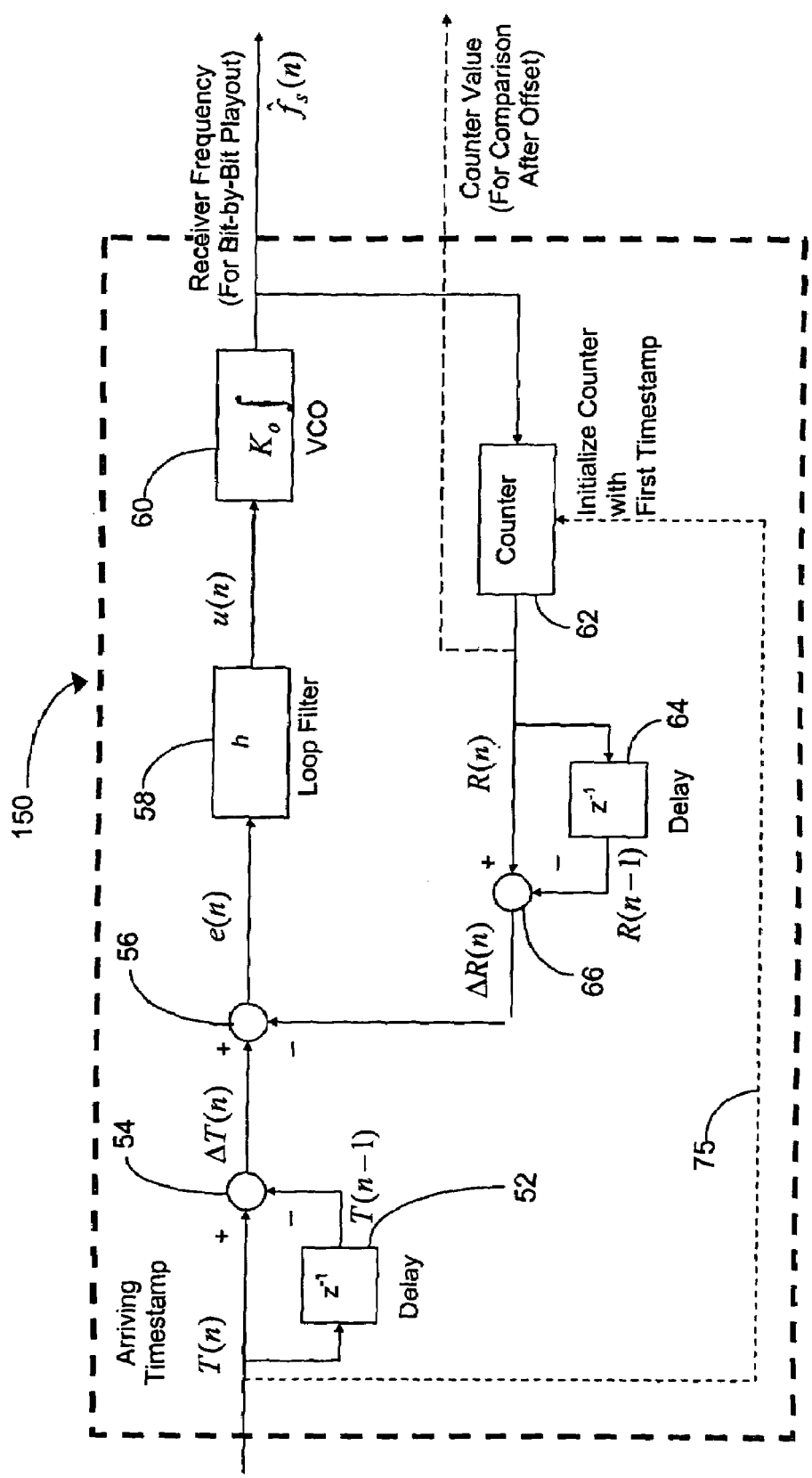
FIG. 3 is a diagram showing the operation of the PLL at the receiver according to an embodiment of the invention.

Using FIG. 3, we describe the operation of the PLL 150 when it is used for data playout at the receiver. Initially, the PLL 150 waits for the first timestamp to arrive. When the first timestamp arrives it is loaded into the counter 62 as indicated by the dashed signal line 75. From this point onwards, the PLL 150 starts to operate in a closed-loop fashion. Each time the $K^{th}$ (K≧1, where K is a downsampling parameter) timestamp arrives (i.e., at sampling instant n=1, 2, 3, . . . ), the difference ΔT(n) between this value T(n) and the value at the previous sampling instant T(n−1) is determined. The difference ΔT(n) is then compared to the timestamp inter-arrival time ΔR(n)=R(n)−R(n−1) measured and computed by the receiver PLL counter 62, the second delay element 64, and the differencing element 66 to give an error term e(n)=ΔT(n)−ΔR(n). This error term is sent to the loop filter 58 whose output controls the frequency of the VCO 60. The output of the VCO 60 in turn provides the clock frequency of the receiver and also drives the counter 62. After a while the error term is expected to converge to zero which means the PLL 150 has been locked to the incoming time base, i.e., time base of the transmitter 12 of FIG. 1. The requirements on stability and frequency accuracy of the recovered clock depend on the type of application at the receiver (e.g., T1/E1, T3/E3, etc.).

Figure 4:
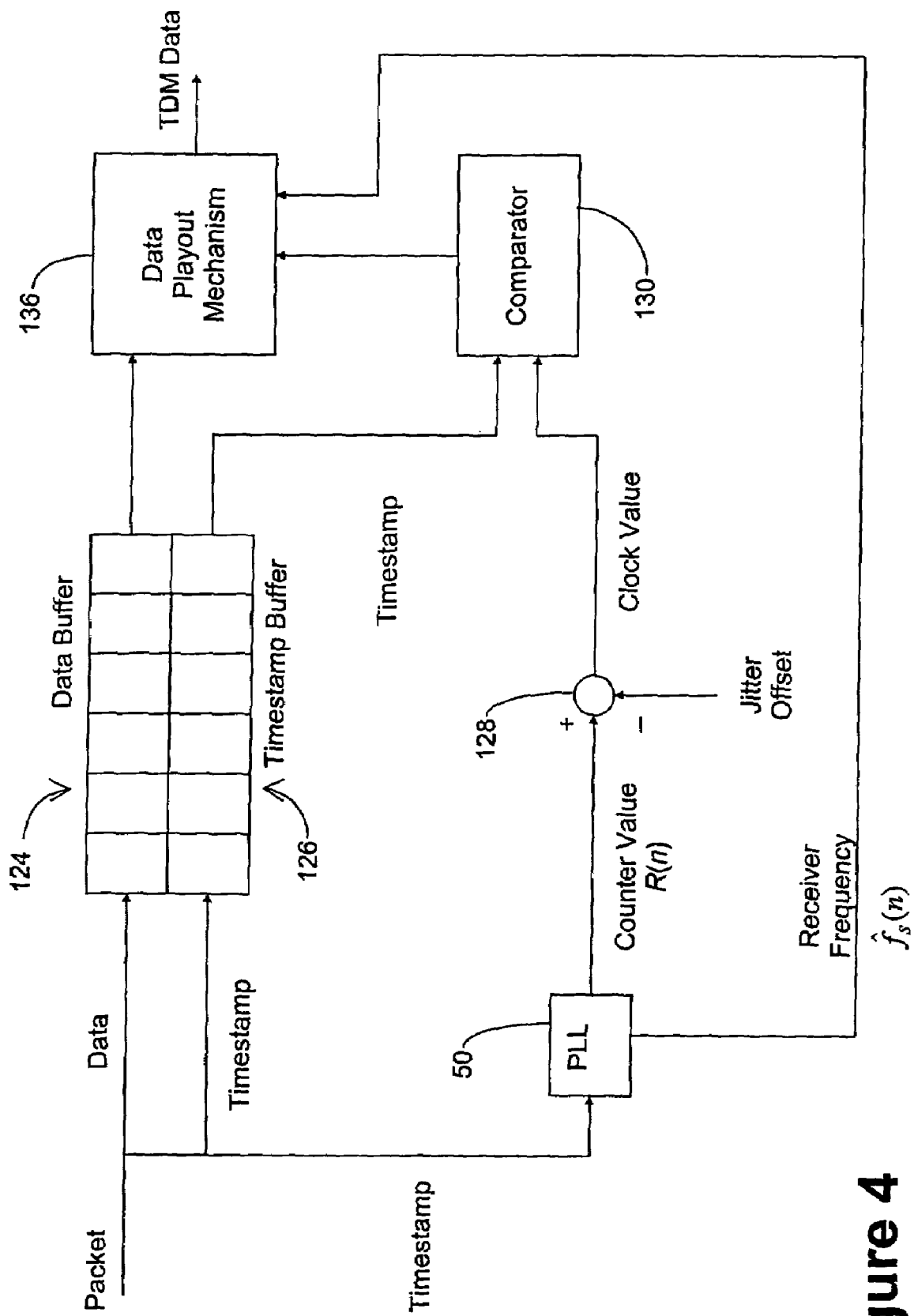
FIG. 4 is a diagram of the payload playout at the receiver using the recovered clock signal according to an embodiment of the invention.

Referring to FIG. 4, there is shown the playout process using the recovered clock signal (i.e., PLL counter value) R(n) as follows. For each data packet (carrying a timestamp) that arrives from the network, the timestamp T(n) is read and sent to the PLL 50. The data (i.e., packet payload) is placed in the receiver data buffer 124. A copy of the timestamp is also stored in a timestamp buffer 126.

The monotonically increasing clock signal (i.e. the counter value) R(n) minus a jitter offset θ differenced at differencing element 128 is periodically compared with the stored timestamps via comparator 130. When equal to a timestamp, the associated payload of the packet is sent to the receiving application (e.g., as TDM data) at the time indicated by the timestamp via data playout mechanism 136. The jitter offset should account for the maximum jitter amplitude and packet loss rate that is allowed in the system.

The size of the receiver buffer 124 can be at least the size of the statistical bound of the delay variations. It can be observed that the clock synchronization mechanism with timestamps provides two important functionalities: timekeeping and jitter attenuation (or absorption).

A number of factors such as poor quality oscillators, temperature changes and other system perturbations can cause frequency drifts in a PLL. These effects cannot always be handled by the primary clock synchronization mechanism described above. In the example application shown in FIG. 4, these frequency drifts over long periods can cause the receiver jitter buffers 124 and 126 (for data and timestamp storage respectively) to overflow or underflow leading to errors and uncontrolled slips in the output TDM signal. A proposed backup mechanism according to an embodiment of the invention maintains clock synchronization during periods of clock degradation by removing any residual errors that are accumulated.

According to one embodiment of the invention, an ongoing vulnerability assessment of the jitter buffer status is performed. The normal mode of operation would have the clock synchronization of the locally derived clock performed by a primary clock recovery mechanism. A long-term frequency setting would be established, for example by derivation from the primary clock recovery mechanism. Should the buffer length approach a value in which the buffer is vulnerable to an underflow condition, or alternatively an overflow condition, then remedial action is initiated. This remedial action would consist of setting the locally derived clock to the long-term term frequency setting, plus a frequency adjustment appropriate to the particular vulnerability (overflow or underflow). The jitter buffer status would be monitored and when the jitter buffer length was such that the jitter buffer status was no longer in a vulnerable state, the locally derived clock could would once again be connected to the primary clock recovery mechanism.

According to another embodiment of the invention, a buffer thresholding approach is used. The current state of the jitter buffer is monitored. When the buffer fill transgresses a specified threshold remedial action is initiated. By transgress is meant to cross the threshold by for example being either being greater-than or greater-than-or-equal-to, or conversely being less-than or less-than-or-equal-to. For example, if the buffer fill grows in excess of an overflow threshold, or in an alternative embodiment shrinks below an underflow threshold, then a backup mechanism would be activated. Conveniently a dual threshold system would allow determining if the buffer fill crosses either of two thresholds (overflow and underflow), thus activating the backup mechanism.

The issues related to this scheme are buffer size and performance. The thresholds need to be far enough away from the actual buffer edges to ascertain that buffer slips will not occur. Since only the present state of the buffer is being examined, no information about the relative magnitude of the frequency offset is available. It is difficult to detect the frequency offset by looking at the buffer fill because of the packet delay variations. The preferred backup mode then is to add a frequency correction to the output frequency to force the buffer back towards the center.

Figure 5:
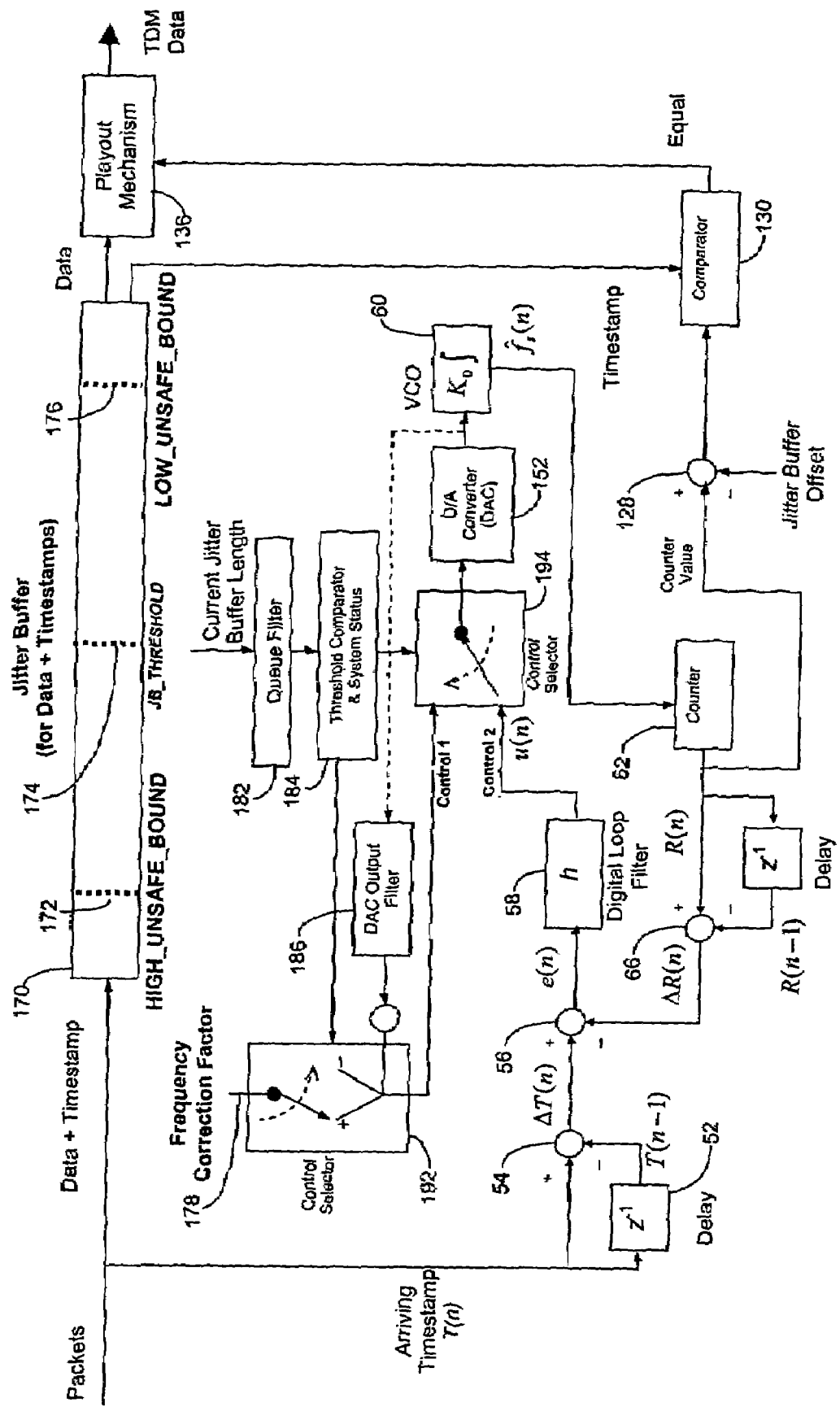
FIG. 5 is a diagram showing the operation of the clock synchronization technique with backup mechanism according to an embodiment of the invention.

Referring to FIG. 5, there may be seen a backup mechanism according to an embodiment of the invention constituted as part of the primary clock recovery mechanism for CES over a packet network. The mechanism works by monitoring the length of the jitter buffer fill jitter buffer 170 and comparing it to some pre-defined-thresholds 172 and 176. (Note that in FIG. 5 the buffer accumulates fill on the right hand side.) When the length of the buffer crosses these thresholds, a degraded clock synchronization mode of operation is declared and the backup clock synchronization mode is activated.

The jitter buffer can be configured with a minimum of one overflow and one underflow thresholds. Additional thresholds are contemplated for applications where multiple thresholds could offer a greater degree of control. The jitter buffer fill can be filtered at queue filter 182 using techniques such as exponentially weighted moving average (EWMA) or moving average (MA). The DAC 152 input (or VCO frequency) can also be filtered at DAC Output Filter 186 using an EWMA or MA filter. This filtered quantity is the average frequency of the system when the primary clock synchronization algorithm is enabled.

During system startup times, the filtered jitter buffer fill values are compared at comparator 184 with the buffer thresholds after an elapse time has passed or steady-state is reached (to allow initial system frequency transients to die out first). After that, if one of the threshold crossings is detected, then the system is switched from the primary algorithm operation mode to the backup mode via control selector 194. In the backup mode, a frequency correction factor as applied by control selector 192 is subtracted from or added to the computed filtered DAC value from DAC output filter 186 (i.e., average frequency) of the system. This operation forces the jitter buffer fill to stabilize between the set of thresholds or towards the center of the buffer. When this is achieved, the system is switched back to the primary algorithm operation mode via control selector 194.

Figure 6:
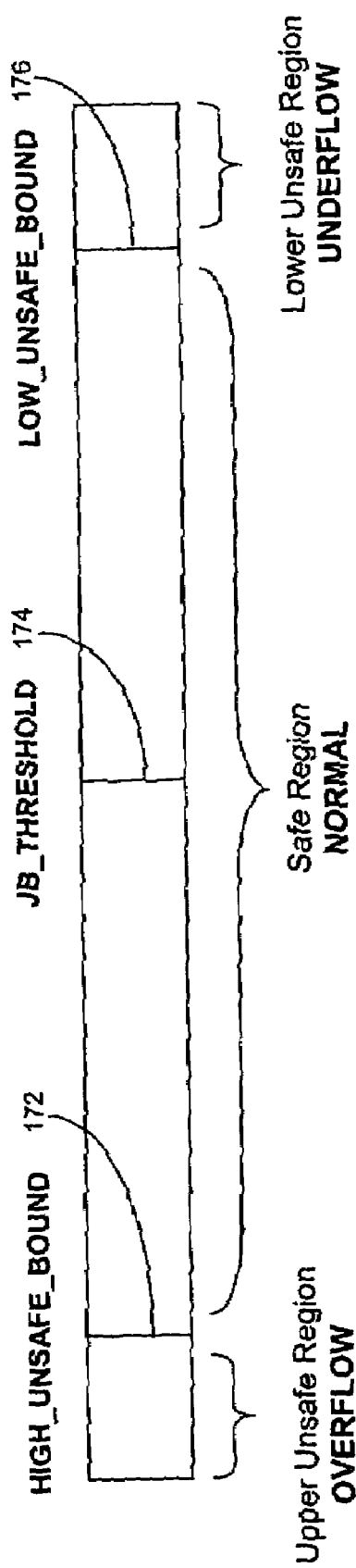
FIG. 6 is a diagram of relation of the jitter buffer thresholds according to an embodiment of the invention.

Referring to FIG. 6, there may be seen the thresholds used in the backup mechanism. The thresholds and some additional terms (to be used in the description of the backup mechanism in algorithm form) are defined as follows:

JB_THRESHOLD 174: The number of packets stored before the playout mechanism starts playing the data out from the jitter buffer. This value is chosen to handle a maximum allowed network jitter to be experienced by the packets. When the system's status is UNDERFLOW or OVERFLOW, the backup mechanism checks to see if the filtered jitter buffer size crosses the JB_THRESHOLD 174 value. If it does then the primary clock recovery algorithm is enabled and the system status is set to NORMAL.

LOW_UNSAFE_BOUND 176: When the jitter buffer goes below this value, the backup mechanism is enabled, the primary clock recovery algorithm is disabled and the system's status is set to UNDERFLOW.

HIGH_UNSAFE_BOUND 172: When the jitter buffer goes above this value, the backup mechanism is enabled, the primary clock recovery algorithm is disabled and the system's status is set to OVERFLOW.

NORMAL: This is a system status indicating that the primary clock recovery algorithm is enabled and the system is running without the backup mechanism.

UNDERFLOW: This is a system status indicating that the primary clock recovery algorithm is disabled, the LOW_UNSAFE_BOUND 176 is crossed, and the backup mechanism is in the process of driving the jitter buffer size back towards the center.

OVERFLOW: This is a system status indicating that the primary clock recovery algorithm is disabled, the HIGH_UNSAFE_BOUND 172 is crossed, and the backup mechanism is in the process of driving the jitter buffer size back towards the center.

DAC_ADJUSTMENT: A frequency correction factor 178 to be added to or subtracted from the computed filtered DAC value (average frequency) of the system.

Figure 7:
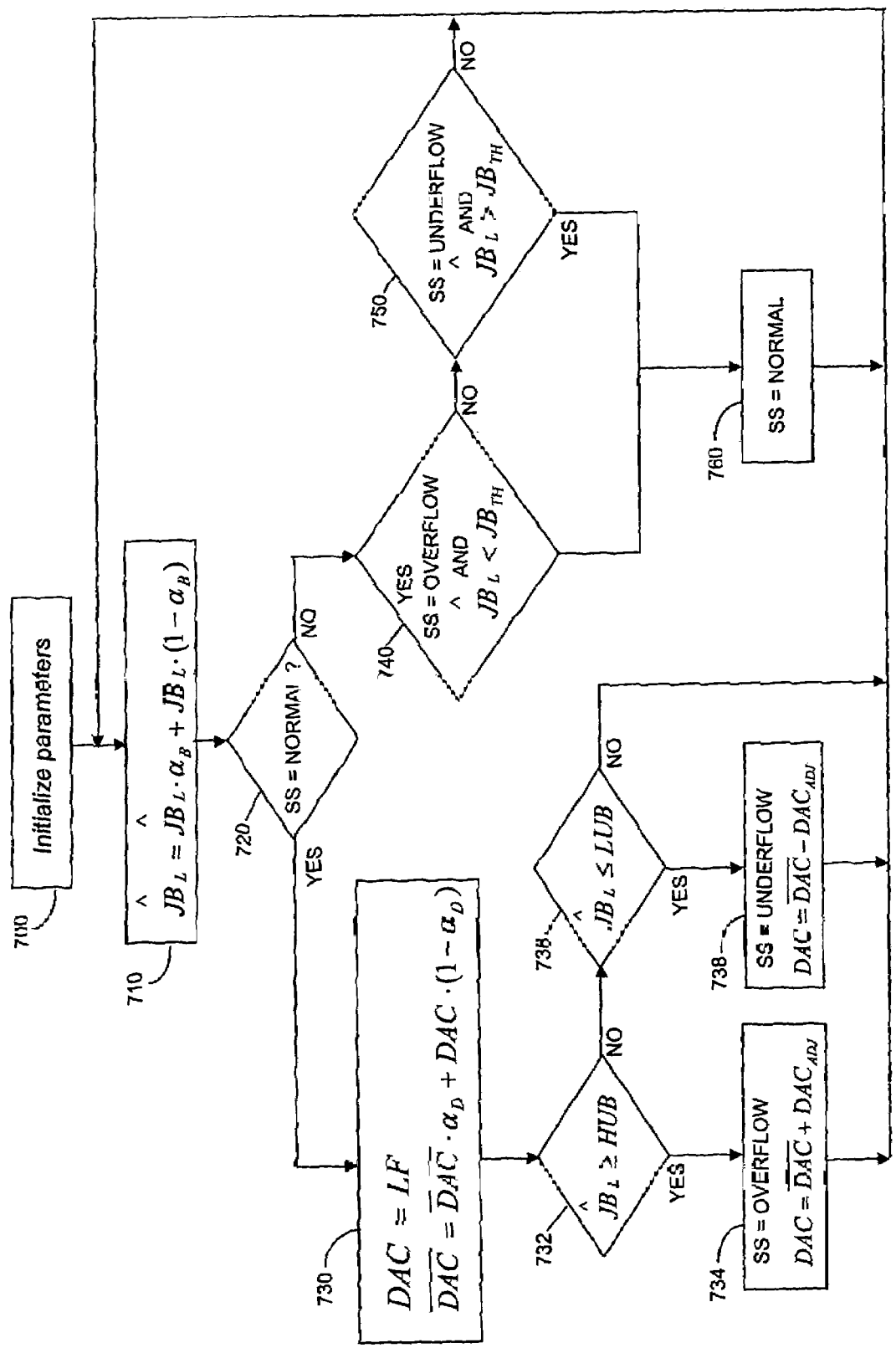
FIG. 7 is a flowchart of a routine for the backup mechanism according to an embodiment of the invention.

FIG. 7 provides a flowchart for an algorithm which may be used for controlling a voltage controlled oscillator for estimating a transmitter clock according to an embodiment of the invention. At step 700, various operating parameters and thresholds are initialized. These may include gains for the various filters and the VCO, as well as jitter buffer thresholds, and delays. At step 710, the iterative algorithm commences, and an exponential weighted moving average (EWMA) is applied to jitter buffer length $JB_L$ to generate a filtered jitter buffer length $\hat{JB}_L$. A typical gain for such an EWMA filter would be 0.9. At step 720 the System State (SS) setting is checked to examine if it is NORMAL. If the System State is NORMAL, control passes to step 730 where the current D/A converter value (DAC) is set to the output of the loop filter (LF). As well at this step, a filtered DAC value is calculated, again using an EWMA filter. A typical gain for the EWMA DAC filter would be 0.9.

Control then passes to step 732 where the filtered jitter buffer length ($\hat{JB}_L$) is compared to the HIGH_UNSAFE_BOUND (HUB). If it is greater than or equal to HUB, control passes to step 734 where the System State is set to OVERFLOW, and the DAC is adjusted by the sum of the filtered DAC value and a DAC adjustment value ($DAC_{ADJ}$). Control then passes back to step 710.

If the filtered jitter buffer length ($\hat{JB}_L$) at step 732 is not greater than or equal to HUB, then control passes to step 736 where the filtered jitter buffer length ($\hat{JB}_L$) is compared to the LOW_UNSAFE_BOUND (LUB). If $\hat{JB}_L$ is less than or equal to LUB, control passes to step 738 where the System State is set to UNDERFLOW, and the DAC is adjusted by the difference of the filtered DAC value minus a DAC adjustment value ($DAC_{ADJ}$). Control then passes back to step 710. If at step 736 $\hat{JB}_L$ is not less than or equal to LUB, control passes back to step 710.

Returning to step 720, should the System State not have tested as NORMAL, then control passes to step 740.

Step 740 performs a double check, ascertaining if the System State is OVERFLOW, and whether the filtered jitter buffer length ($\hat{JB}_L$) is less than JB_THRESHOLD ($JB_{TH}$). If the logical AND of these conditions is true, then control passes to step 760 where the System State is set to NORMAL. If the logical AND of these conditions is not true, control passes to step 750.

Step 750 performs a double check, similar to step 740, ascertaining if the System State is UNDERFLOW, and whether the filtered jitter buffer length ($\hat{JB}_L$) is greater than JB_THRESHOLD ($JB_{TH}$). If the logical AND of these conditions is true, then control passes to step 760 where the System State is set to NORMAL. If the logical AND of these conditions is not true, control passes to step 710.

From step 760, wherein the System State is set to NORMAL, control passes to step 710.

Referring to FIG. 8, there may be seen a pseudo-code routine for the backup mechanism according to an embodiment of the invention.

In summary, there has been provided a description of a backup mechanism for maintaining clock synchronization during periods of degraded clock synchronization. The mechanism works by removing any residual errors accumulated due to temperature change, oscillator degradation and other unaccountable system perturbations. The mechanism is based on observing the length of a receiver jitter buffer and comparing it to some pre-defined thresholds. When the length of the buffer crosses these thresholds, a degraded clock synchronization mode of operation is detected and the backup clock synchronization mode is activated (i.e., the clock synchronization scheme switches from primary mode to backup mode).

At this point it should be noted that the clock synchronization backup mechanism as described above typically involve the processing of input data and the generation of output data to some extent. This input data processing and output data generation may be implemented in hardware or software. For example, specific electronic components may be employed in a receiver or similar or related circuitry for implementing the functions associated with the clock synchronization backup mechanism as described above. Alternatively, one or more processors operating in accordance with stored instructions may implement the functions associated with the clock synchronization backup mechanism as described above. If such is the case, it is within the scope of the present invention that such instructions may be stored on one or more processor readable media, or transmitted to one or more processors via one or more signals.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for maintaining clock synchronization in a network receiver having a jitter buffer and a frequency matching mechanism, said frequency matching mechanism having a primary clock recovery mechanism, a current frequency setting, a long-term frequency setting, a normal state, and an abnormal state, the method comprising the steps of:

(a) setting said frequency matching mechanism to the normal state;

(b) setting said current frequency setting to the frequency of said primary clock recovery mechanism;

(c) checking if said frequency matching mechanism is in the normal state and (d) in the case that said frequency matching mechanism is in the normal state then setting said current frequency setting to the frequency of said primary clock recovery mechanism and (e) testing said jitter buffer so as to assess whether it is at a vulnerable state of fill and, (f) in the case that said jitter buffer is at a vulnerable state of fill then setting said current frequency setting to the sum of said long-term frequency setting and a frequency adjustment, setting said frequency matching mechanism to the abnormal state, and returning to step (c);

(g) in the case that said jitter buffer is not at a vulnerable state of fill then returning to step (c); and (g) in the case that said frequency matching mechanism is not in the normal state then testing if it is true that said jitter buffer is at a vulnerable state of fill; and, (h) in the case that said jitter buffer is at a vulnerable state of fill then returning to step (c); and (i) in the case that said jitter buffer is not at a vulnerable state of fill then setting the frequency matching mechanism to normal state and returning to step (c).

2. The method of claim 1 wherein said abnormal state comprises at least one of an overflow state and an underflow state.

3. The method of claim 2 wherein
said frequency adjustment is a positive amount for the condition of an overflow state and wherein
said frequency adjustment is a negative amount for the condition of an underflow state.

4. The method of claim 3 further comprising an additional step within step (c) occurring just previous to the step of checking if said frequency matching mechanism is in the normal state, said additional step comprising receiving a jitter buffer fill value.

5. The method of claim 4 wherein said jitter buffer fill value is used in subsequent step (e) and step (g) as part of the test of whether said jitter buffer is at a vulnerable state of fill.

6. The method of claim 5 wherein said jitter buffer fill value is compared to at least one threshold value in subsequent step (e) and step (g) as part of the test of whether said jitter buffer is at a vulnerable state of fill.

7. The method of claim 1 wherein said long-term frequency operational frequency setting is determined by filtering said output frequency of said frequency matching mechanism.

8. The method of claim 7 wherein said output frequency of said frequency matching mechanism is filtered using a moving average filter.

9. The method of claim 8 wherein said output frequency of said frequency matching mechanism is filtered using an exponential weighted moving average filter.

10. The method of claim 9 wherein said exponential weighted average filter has a gain of about 0.9.

11. A method for maintaining clock synchronization in a network receiver having a jitter buffer and a frequency matching mechanism, said frequency matching mechanism having a primary clock recovery mechanism, a current frequency setting, a long-term frequency setting, a normal state, an underflow state, and an overflow state, and a first, second and third threshold associated with said jitter buffer, the method comprising the steps of:

(a) setting said frequency matching mechanism to the normal state;

(b) setting said current frequency setting to the frequency of said primary clock recovery mechanism;

(c) receiving a jitter buffer fill value;

(d) checking if said frequency matching mechanism is in the normal state and (e) in the case that said frequency matching mechanism is in the normal state then
setting said current frequency setting to the frequency of said primary clock recovery mechanism and comparing said jitter buffer fill value to a first threshold; and, (f) in the case that said jitter buffer fill value transgresses said first threshold then
setting said current frequency setting to the sum of said long-term frequency setting plus a frequency adjustment,
setting said frequency matching mechanism to the overflow state, and
returning to step (c);

(g) in the case that said jitter buffer fill value does not transgress said first threshold then comparing said jitter buffer fill value to a second threshold; and, (h) in the case that said jitter buffer fill value transgresses said second threshold then
setting said current frequency setting to the sum of said long-term frequency setting minus a frequency adjustment,
setting said frequency matching mechanism to the underflow state, and
returning to step (c);

(i) in the case that said jitter buffer fill value does not transgress said second threshold then
returning to step (c); and (j) in the case that said frequency matching mechanism is not in the normal state then testing if it is true that said frequency matching mechanism is in the overflow state and that said jitter buffer fill value is lower than a third threshold; and, (k) in the case that the conditions of step (j) are true then setting said frequency matching mechanism to normal state and returning to step (c); and (l) in the case that the conditions of step (j) are not true then testing if it is true that said frequency matching mechanism is in the underflow state and that said jitter buffer fill value is higher than said third threshold; and, (m) in the case that the conditions of step (l) are true then setting the frequency matching mechanism to normal state and returning to step (c); and (n) in the case that the conditions of step (l) are not true then returning to step: (c).

12. The method of claim 11 further comprising the additional steps of:
filtering said jitter buffer fill value immediately following (c) and utilizing said filtered jitter buffer fill value in subsequent steps in place of the unfiltered jitter buffer fill value.

13. The method of claim 12 wherein said filtering uses an exponential weighted average filter method.

14. The method of claim 13 wherein said exponential weighted average filter method uses a filter gain of about 0.9.

15. An article of manufacture for controlling a data flow in a data network, the article of manufacture comprising at least one processor readable storage medium and instructions stored on the at least one storage medium; wherein the instructions are configured to be readable from the at least one storage medium by at least one processor and thereby cause the at least one processor to operate so as to maintain clock synchronization in a network receiver having a jitter buffer and a frequency matching mechanism, said frequency matching mechanism having a primary clock recovery mechanism, a current frequency setting, a long-term frequency setting, a normal state, and an abnormal state, the method comprising the steps of:

(a) setting said frequency matching mechanism to the normal state;

(b) setting said current frequency setting to the frequency of said primary clock recovery mechanism;

(c) checking if said frequency matching mechanism is in the normal state and (d) in the case that said frequency matching mechanism is in the normal state then setting said current frequency setting to the frequency of said primary clock recovery mechanism and
(e) testing said jitter buffer so as to assess whether it is at a vulnerable state of fill and,
(f) in the case that said jitter buffer is at a vulnerable state of fill then
setting said current frequency setting to the sum of said long-term frequency setting and a frequency adjustment,
setting said frequency matching mechanism to the abnormal state, and
returning to step (c);

(g) in the case that said jitter buffer is not at a vulnerable state of fill then returning to step (c); and
(g) in the case that said frequency matching mechanism is not in the normal state then testing if it is true that said jitter buffer is at a vulnerable state of fill; and,
(h) in the case that said jitter buffer is at a vulnerable state of fill then returning to step (c); and
(i) in the case that said jitter buffer is not at a vulnerable state of fill then setting the frequency matching mechanism to normal state and returning to step (c).

* * * * *